(12) United States Patent
Hermansen

(10) Patent No.: US 7,814,754 B2
(45) Date of Patent: Oct. 19, 2010

(54) METHOD, SYSTEM AND MOULD-BOX FOR CREATING FORM-MOULDED ITEMS OF EDIBLE ICE

(75) Inventor: Carsten Hermansen, Aarhus (DK)

(73) Assignee: Tetra Laval Holding & Finance S.A., Pully (CH)

( * ) Notice: Subject to any disclaimer, the term of this patent is extended or adjusted under 35 U.S.C. 154(b) by 1114 days.

(21) Appl. No.: 10/515,839

(22) PCT Filed: May 20, 2003

(86) PCT No.: PCT/DK03/00335

§ 371 (c)(1),
(2), (4) Date: Nov. 29, 2004

(87) PCT Pub. No.: WO03/099034

PCT Pub. Date: Dec. 4, 2003

(65) Prior Publication Data

US 2006/0034989 A1    Feb. 16, 2006

(30) Foreign Application Priority Data

May 28, 2002   (DK) ............................... 2002 00819

(51) Int. Cl.
*F25C 1/04* (2006.01)
(52) U.S. Cl. ............................... 62/66; 62/356; 249/81; 425/144
(58) Field of Classification Search .................. 62/345, 62/356, 66; 249/81, 79, 80; 425/144
See application file for complete search history.

(56) References Cited

U.S. PATENT DOCUMENTS

| | | | | | |
|---|---|---|---|---|---|
| 2,287,255 | A | * | 6/1942 | Langgaard | 62/346 |
| 2,287,256 | A | * | 6/1942 | Langgaard | 62/346 |
| 2,400,517 | A | * | 5/1946 | Kirkpatrick | 62/346 |
| 2,442,146 | A | * | 5/1948 | Reagin | 62/345 |
| 4,151,236 | A | * | 4/1979 | Ryder | 264/39 |
| 4,352,830 | A | * | 10/1982 | Billett et al. | 426/421 |
| 4,413,461 | A | | 11/1983 | Waldström | |
| 4,548,573 | A | | 10/1985 | Waldström | |
| 5,167,132 | A | * | 12/1992 | Meier | 62/352 |
| 5,265,439 | A | * | 11/1993 | Hobelsberger | 62/356 |
| 5,725,891 | A | * | 3/1998 | Reid, Jr. | 425/407 |
| 6,048,189 | A | * | 4/2000 | Kurihara et al. | 425/149 |
| 6,289,683 | B1 | * | 9/2001 | Daukas et al. | 62/68 |

FOREIGN PATENT DOCUMENTS

EP          0 132 412        1/1985

OTHER PUBLICATIONS

International Search Report dated Aug. 19, 2003.

* cited by examiner

*Primary Examiner*—William E Tapolcai
(74) *Attorney, Agent, or Firm*—Roberts Mlotkowski Safran & Cole, P.C.; David S. Safran

(57) ABSTRACT

A method, a system, and a mould box for creating form-moulded items of edible ice from an ice mass. The method includes filling at least one mould created between a number of mould boxes with ice mass, and the introduction of cooling or heating medium into the mould boxes, where the flow of the cooling or heating medium is controlled by one or more control units in the mould boxes.

19 Claims, 11 Drawing Sheets

METHOD, SYSTEM AND MOULD-BOX FOR CREATING FORM-MOULDED ITEMS OF EDIBLE ICE

BACKGROUND OF THE INVENTION

1. Field of the Invention

The present invention relates to a method, a system and a mould-box for creating form-moulded items of edible ice from an ice mass.

2. Description of Related Art

The traditional manner in which items of edible ice are produced is for a series of moulds to be conveyed extending downwards in a freezing bath, typically salt-brine, past a filling station and thereafter, a section for an adequate period of time in order that the ice items can at least be shell-frozen, after which the moulds are lifted over and conveyed further along a shorter section in a heating bath to achieve the thawing for freeing the ice item for subsequent detachment from the mould. This technique requires that the ice items are freely extractable, i.e. that the moulds are configured internally with mould slip.

There is a considerable market for "3D-products", i.e., edible ice items which do not appear with precisely this slip shape, but with bulges and undercuts, and during the course of time several different methods have been proposed for the formation of such items, e.g. by pressure moulding of pre-manufactured items, the application of extra ice mass on the items, or the use of moulds which can be opened. The present invention is directed to this last-mentioned technique, which mechanically and control-wise, is relatively cost effective to implement and reliable in function.

In connection with openable moulds that typically have mutually bottom-hinged mould half parts, it is a problem to use brine as a surrounding freezing medium because small leaks can not be completely excluded. Thus, U.S. Pat. No. 4,548,573, suggests that it is better to use cold air as freezing medium. In connection with ice freezing, it is also known to use diverse cryogene techniques, which are edible-item friendly, are also relatively complicated or expensive.

From the European patent application EP-A2 0 132 412, there is also known a method for the production of edible ice items by the filling of ice mass into a mould created by two mould half-parts. In the half-parts, it is possible to introduce a freezing medium through the half-parts, and herewith, freeze the ice mass to form ice-lollies. When the ice-lollies are to be freed from the mould half-parts, this is effected by means of gravity by influencing the mould mechanically, or by influencing the ice-lollies mechanically at the same time that the half-parts are moved away from each other. The removal of the ice-lollies from the mould half-parts requires considerable force, which among other things can be detrimental to the surface quality of the lollies.

SUMMARY OF THE INVENTION

The primary object of the present invention is to provide a method and an apparatus for creating form-moulded items of edible ice from an ice mass, where the above-mentioned disadvantages of the known techniques are obviated, and at the same time, a cooling/freezing medium is utilised in an effective manner.

The invention relates, among other things, to a method whereby flow of the cooling or heating medium is controlled by one or more control units in the mould boxes.

By controlling flow of the cooling or heating medium, it is possible to achieve an effective utilisation of the medium, primarily for the reason that it can be led along the surfaces which contain the forming areas at the same time that pressure loss can be reduced since the number/amount of eddy currents are limited. The flow can also be controlled so that it hits surfaces at a more expedient angle, and the eddy currents are hereby limited further.

The expression "cooling medium" as used herein is to be understood as something which can cool or freeze a given item of edible ice, where a typical temperature for a cooling medium will be between minus 20 and minus 50 degrees centigrade, and where the cooling medium will typically surrender 3 to 5 degrees centigrade when cooling the contents in the moulds in the mould boxes.

The expression "control unit" as used herein is to be understood as a unit which controls a medium so that the direction of flow differs from that without the use of control units in the mould box. The control unit can also spread and distribute the amount of flow over a given area in the mould box.

The expression "mould box" as used herein is to be understood broadly as a structure which has an inner cavity defined by a number of outer surfaces, where one or more of the surfaces can form part of a mould. The mould box can, in principle, be of any shape, i.e. round, triangular, rectangular, square and so on, where at the same time, there is no limitation to its length, height etc., except that which is naturally set by the connection in which it is used.

An aspect of the invention is that use is made of cooled brine as cooling medium. The cooled brine preferably has a temperature of around minus 40 degrees centigrade. Experiments have shown that at such low temperatures, a "tunnel effect" appears which, in brief, means that the cooling medium, to a high degree, maintains that structure it has when it leaves the control unit, instead of spreading out to assume fan formations in front of an opening/nozzle, for example. Providing that there are no objects with which the flow can collide, it is herewith possible to achieve a controlled flow along a surface without any great changes occurring in the flow. At the same time, the flow will be in a more controlled manner following the surface of an object if this is hit at an expedient angle, instead of forming eddies which stop, or slow down, the flow.

A further aspect of the invention is that at least one opening for the one or more control units controls the flow of the cooling or the heating medium in a direction that is mainly at right-angles to the direction of flow of the cooling or heating medium at the inlet stubs.

The invention also relates to a system where the mould boxes contain one or more control units for controlling flow of the cooling or heating medium. It is hereby possible to create a system where pressure loss for the cooling or heating medium in the system is reduced through the expedient controlling of the flow. Among other things, this makes it easier to control the flow, and herewith achieve a uniform temperature over the whole mould surface of the mould box. Also, the amount of cooling or heating medium can be limited for the reason that better utilisation is made of the cooling/heating effect of these media.

An aspect of the invention is that the least two connection couplings are snap-couplings such as snap-lock couplings, and/or at least one of the connections to each of the connection couplings comprises of flexible pipes. It is hereby possible to quickly couple and decouple the mould boxes to/from the system, e.g., in connection with the construction of a new system or the cleaning of an existing system. With the use of snap-couplings, it is at the same time possible to indicate to the assembler that a secure and tight connection has been made between the mould box and the rest of the system.

An aspect of the invention is that the fixed part contains an inlet channel through which the cooling medium is jointly supplied to the mould boxes, and an outlet channel where the cooling medium is collected and led away after having flowed through the mould boxes. It is hereby possible to supply/empty all the mould boxes at the same time, and herewith ensure a uniform processing of the contents of the individual moulds created between the mould boxes.

A third aspect of the invention is that use is made of cooled brine as cooling medium, whereby an advantageous embodiment of the invention is achieved.

The invention also comprises a mould box, where the at least one cavity contains one or more control units for controlling flow of the cooling or heating medium, whereby an advantageous embodiment of the invention is achieved.

Another aspect of the invention is that the one or more control units are in direct connection with the connection stub and/or at least one discharge unit for the flow of a cooling or heating medium is in direct connection with the outlet stub. It is hereby ensured that the cooling or heating medium is utilised to as great a degree as possible in its controlled form by the medium being controlled immediately after the inlet to the mould box, and first removed in a controlled manner at the outlet from the mould box. It should be noted that the cooling or heating medium can be controlled and/or led from the mould box in such a manner whereby this does not take place as close to the stubs as possible, e.g., in a manner where the units are placed some distance inside the box with pipe connections to the stubs.

A further aspect of the invention is that there is a control unit and a discharge unit. Another advantageous embodiment of the invention is achieved where the cooling or heating medium describes a path through the mould box in a manner which is as controlled as possible.

It shall be made clear, however, that in its basic form, the present invention may comprise only a control unit without a discharge unit. Similarly, it should also be noted that a mould box can contain a multiple of control units and/or discharge units.

Yet another aspect of the invention is that the one or more control units and/or the one or more discharge units have at least one opening, such as one to seven openings, and preferably five or six openings. The possibility is hereby achieved for distribution of flow of the cooling or heating medium in an even manner along the mould surfaces. The advantageous number of openings and their size depends most often on the size of the mould box, but experiments have shown that five or six openings of a size of approximately 5 millimeters are advantageous in many practical applications.

Another aspect of the invention is that the least one opening is circular or oval in shape. It is hereby possible to ensure the greatest possible continuous "tunnel effect", in that corners/angles which naturally cause turbulence are avoided.

Still another aspect of the invention is that the least one opening is an elongated opening which wholly or partly extends for the length of the control unit and/or discharge unit. It is hereby possible to create a kind of "blanket" flow along the mould surfaces in the mould box, where the flow will transfer cold or heat in a particularly uniform manner.

Yet another aspect of the invention is that the least one opening for the control unit has a shape and positioning which controls the flow of the cooling or heating medium in a direction mainly at right-angles to the direction of the flow of the cooling or heating medium at the inlet stubs. It is hereby possible to control flow down along a mould surface in a preferably elongated mould box, which ensures an even flow along the surface of the mould.

These and other aspects, features and advantages of the present invention will become more apparent from the following detailed description of the preferred embodiments of the present invention when viewed in conjunction with the accompanying drawings.

DETAILED DESCRIPTION OF THE INVENTION

Figure 1:
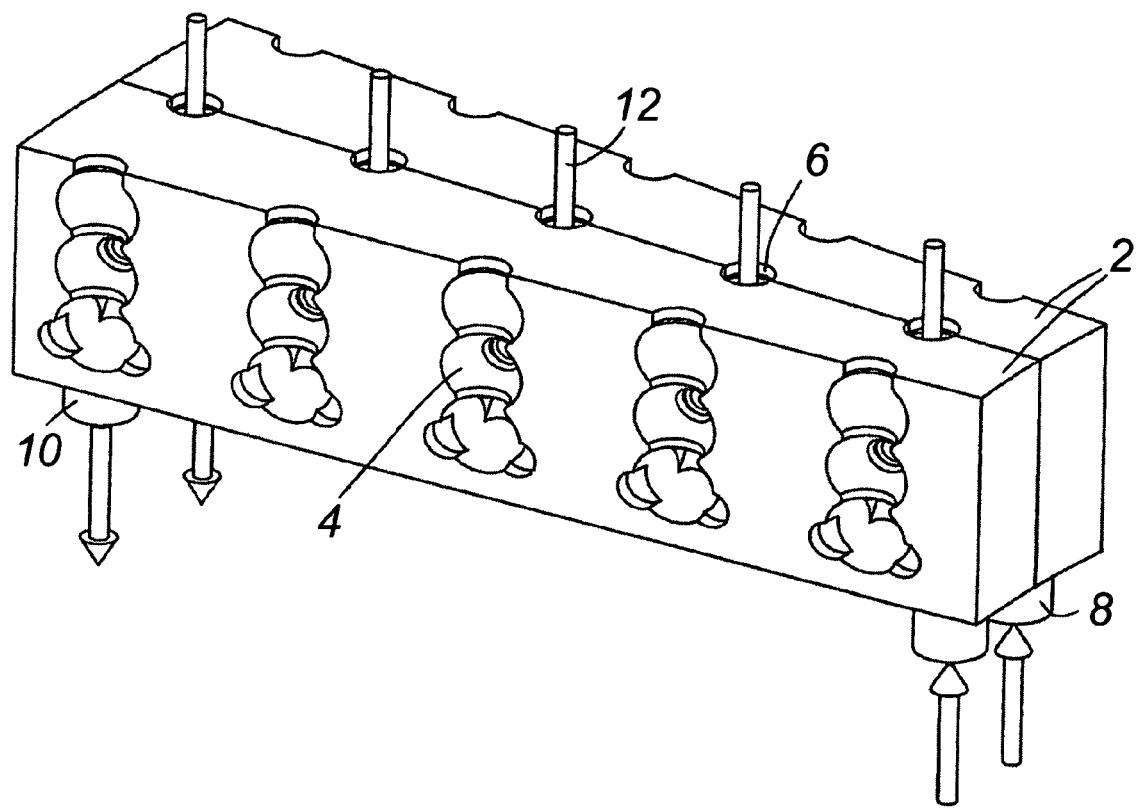
FIG. 1 is a perspective view showing two mould boxes placed together in accordance with one embodiment of the present invention.

FIG. 1 shows two hollow mould boxes 2 placed together, where each box is configured with recesses in the form of mould half-parts 4 in the opposite surfaces thereof. When the boxes are placed together, in the middle, there will thus be formed a series of mould cavities which are closed at the bottom and at the sides, while at the top, they have a filling opening 6. In the bottom at the one side, each box has an inlet stub 8, and at the opposite side, an outlet stub 10, for establishing a flow through the box.

FIG. 1 shows that in the filling openings 6, there are inserted respective filling pipes 12 through which the mould cavities are filled with ice mass, after which the filling pipes 12 are removed. In connection with the filling of the mould cavities with the ice mass, a cooling medium, preferably cold brine, is introduced through the boxes 2, where this flows from the inlet stub 8 through each mould box to the outlet stub 10. When the ice is half-frozen, support sticks (not shown) can be inserted down through the openings 6.

When the freezing has been completed, a change is made to a brief through-flow with a suitable heating medium, such as hot brine or other medium, for thawing the surface of the frozen ice items so as to free the frozen ice items, after which the boxes are separated from each other. In this thawing-free process, the outermost layer of the frozen ice item is melted. If the ice items are provided with support sticks (not shown), these can be gripped with known stick-gripping equipment before the opening of the mould, but otherwise special gripping elements can be arranged. In this regard, the thawing-free process may be implemented in a first phase where one-sided is thawed free so that upon the opening of the mould the ice items remain retained in the box, which after a gripping of the items is then heated for final release of the ice items. In special cases, the items will be able to be released and simply fall down on to a conveyor such as a packaging conveyor. With respect to handling of the items is concerned, it will be an advantage that work can be carried out in a completely dry environment.

Figure 2:
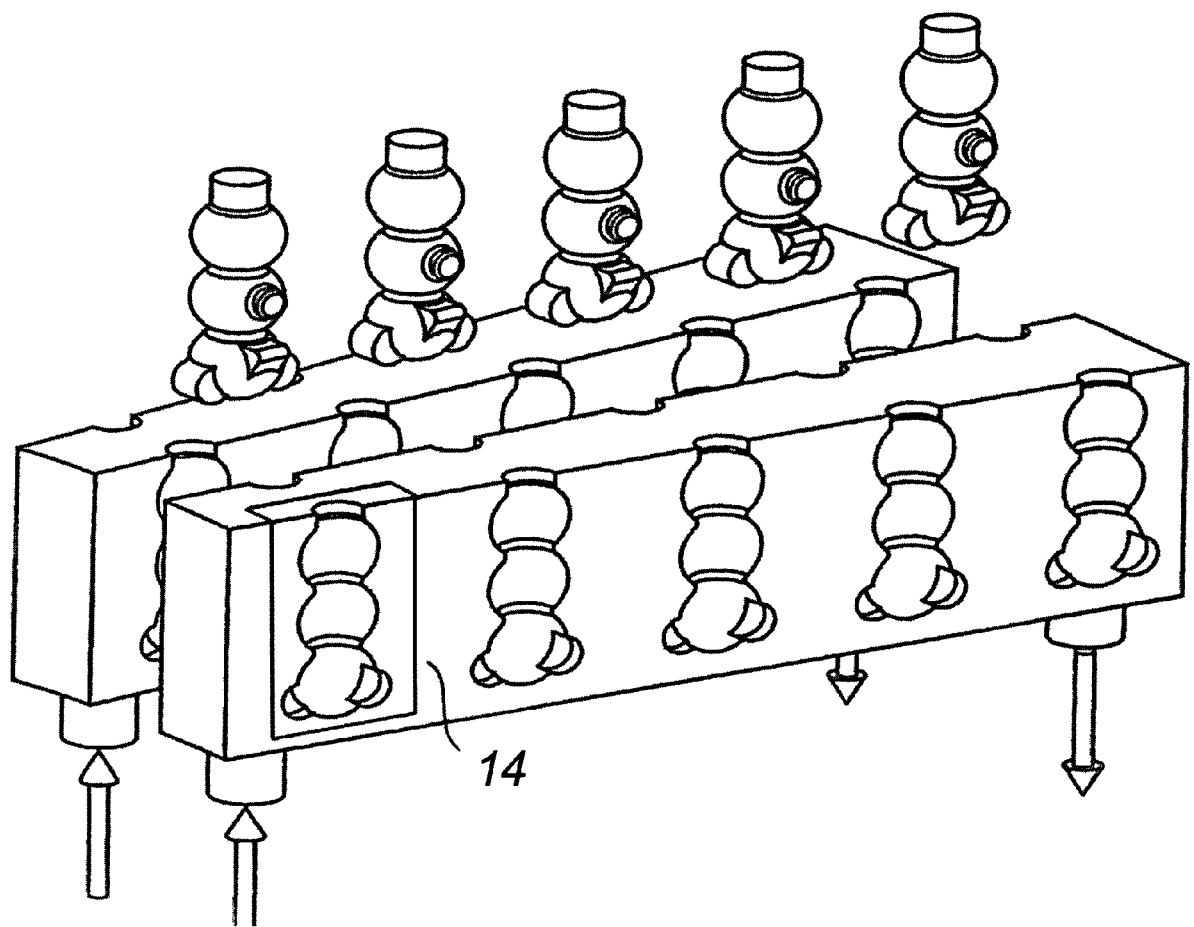
FIG. 2 is a perspective view showing the mould boxes separated from each other.

FIG. 2 shows that mould half-parts 14 can possibly be placed in the boxes in a changeable manner. It is hereby possible to create different types of edible ice items with the same mould boxes by using changeable mould half-parts 14 with those having different shapes. The fastening of the changeable mould half-parts 14 to the boxes may be effected with the use of sealing agents which ensure that the cooling or heating medium in the box cannot seep out to the ice items.

Figure 3:
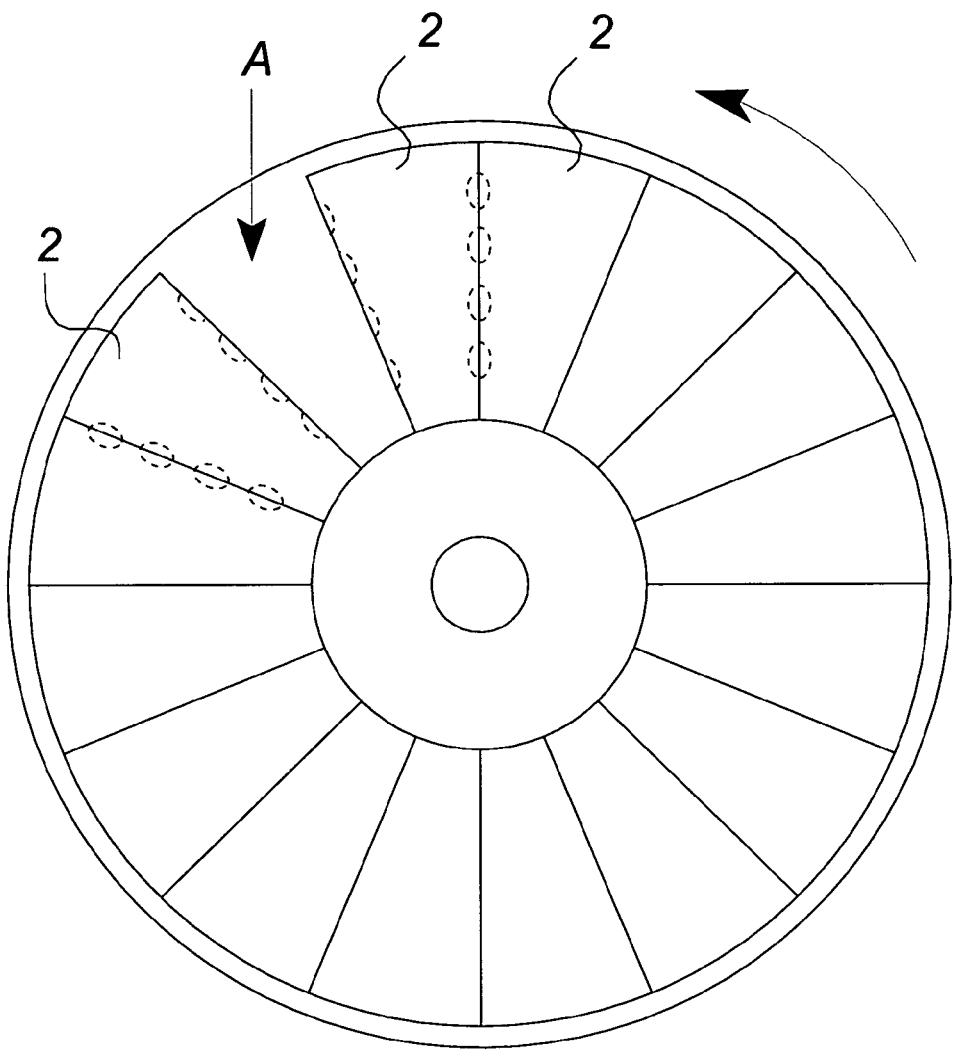
FIG. 3 shows a top schematic view of a system for use in the creating of form-moulded items of edible ice from an ice mass.

FIG. 3 shows that the mould boxes 2 can be arranged to extend in a circular manner, entirely corresponding to the mould-supporting segments in a conventional moulding machine of the circular table type. At a single place A, there is room to enable the creation of the necessary opening between the boxes for the removal of the ice items. This place can have a fixed positioning when the ring of boxes is moved in the circular direction, but alternatively, the ring as a whole can be immovable, merely providing that the boxes can be pivoted in such a manner that they can successively be opened from each other as at place A. It will hereby be the place A which moves in the circular direction, and thus naturally, it must be arranged that both the gripping arrangement and the filling arrangement are swung around in a corresponding movement.

Figure 4:
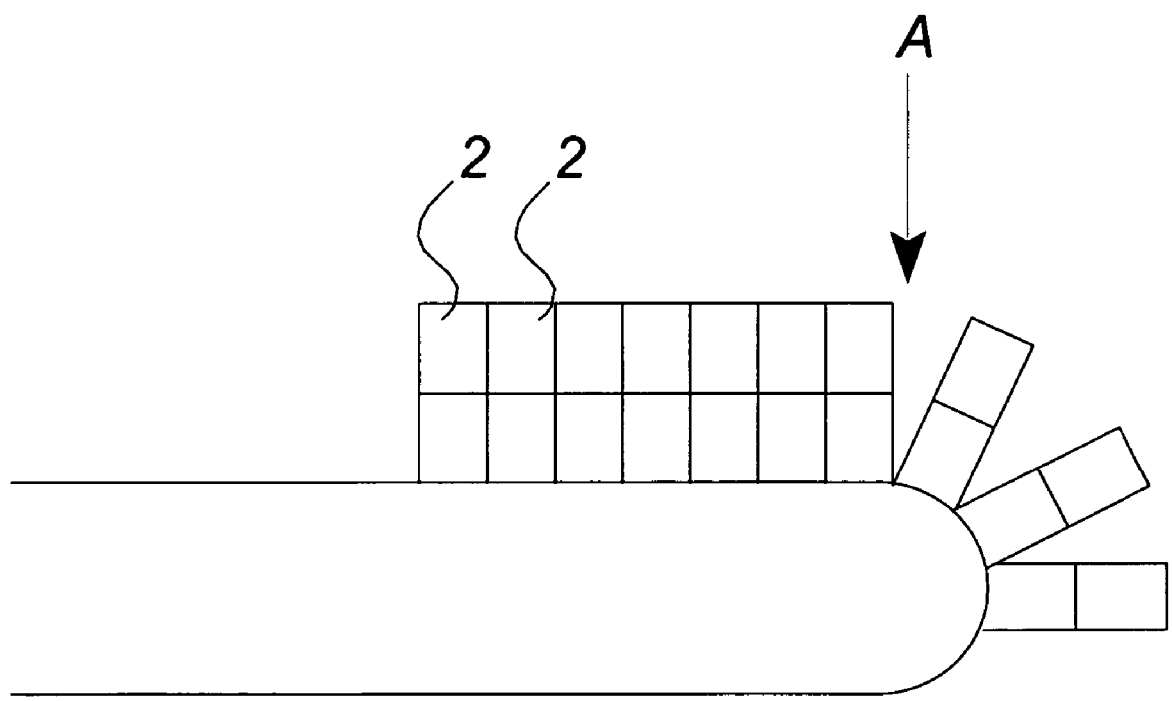
FIG. 4 shows a side schematic view of a second type of system for use in the creating of form-moulded items of edible ice from an ice mass.

FIG. 4 shows that the boxes 2 can also be conveyed along a straight section, e.g. on a conveyor, whereby the opening place A will automatically be situated at a reversing end as shown. In principle, the boxes can be configured so that they co-operate only in pairs, whereby in the placed-together condition, they can be led around such a reversing point for further freezing effect during the lower return run. Alternatively, there can also be effected a selective or one-sided thawing-free process to enable the opening sequence shown in FIG. 4, so that upon transition to the return run, there occurs a re-closing of the boxes around the conveyed partly frozen ice items for subsequent final freezing of the items.

Figure 5:
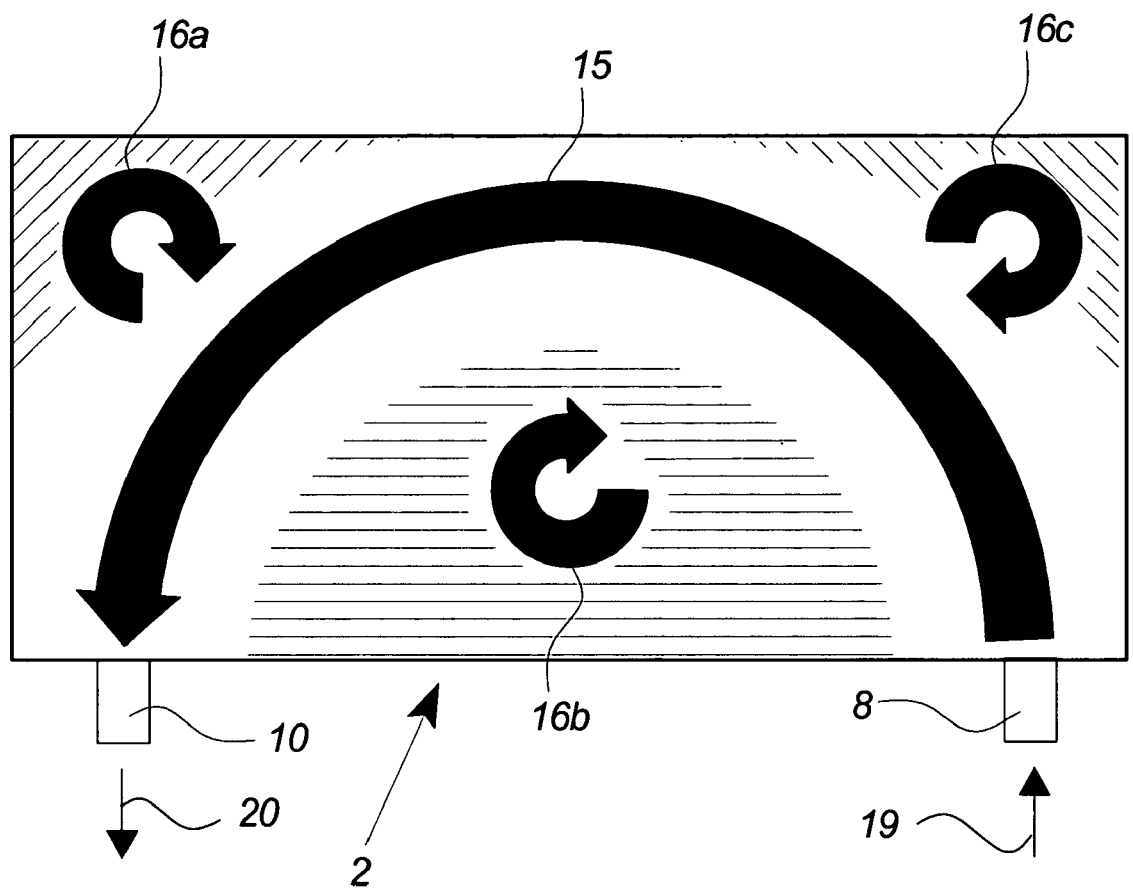
FIG. 5 shows a schematic illustration of an example flow condition for the cooling or heating medium in a mould box as viewed from the side.

FIG. 5 shows a side schematic view of an example flow condition for a cooling or heating medium in a mould box 2. As can be seen, there is created a main flow 15 of cooling or heating medium centrally through the box, and a number of secondary flows 16a-16c around the main flow. The main flow starts from the inlet stub 8 and extend in an arc to the outlet stub 10. The secondary flows arise primarily in the corners of the box 16a, 16c where the flow is stopped, and in the area created under the main flow 16b where there is a small flow of cooling or heating medium. In the areas with secondary flows, the cooling or heating medium is either completely static or have a considerably lower velocity than the main flow.

Figure 6A:
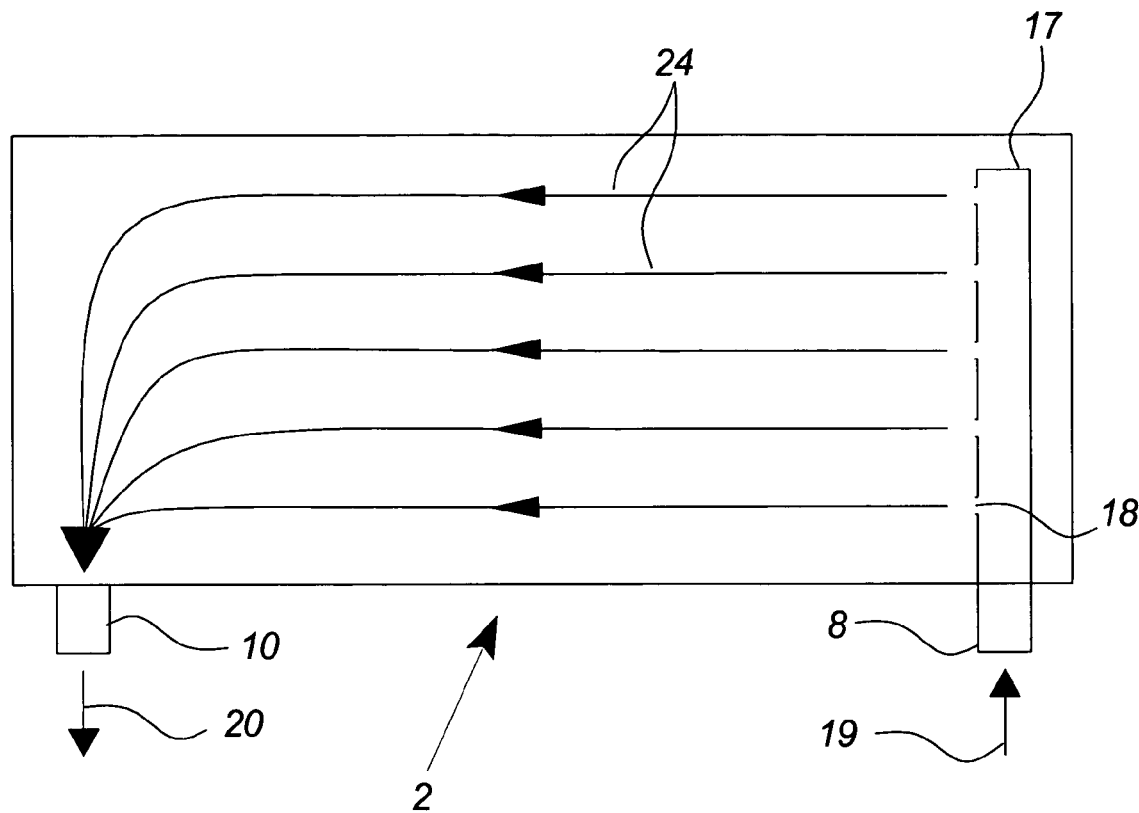
FIGS. 6a and 6b show schematic illustrations of the flow conditions in a first embodiment of a mould box, seen from the side and from above, respectively.
Figure 6B:
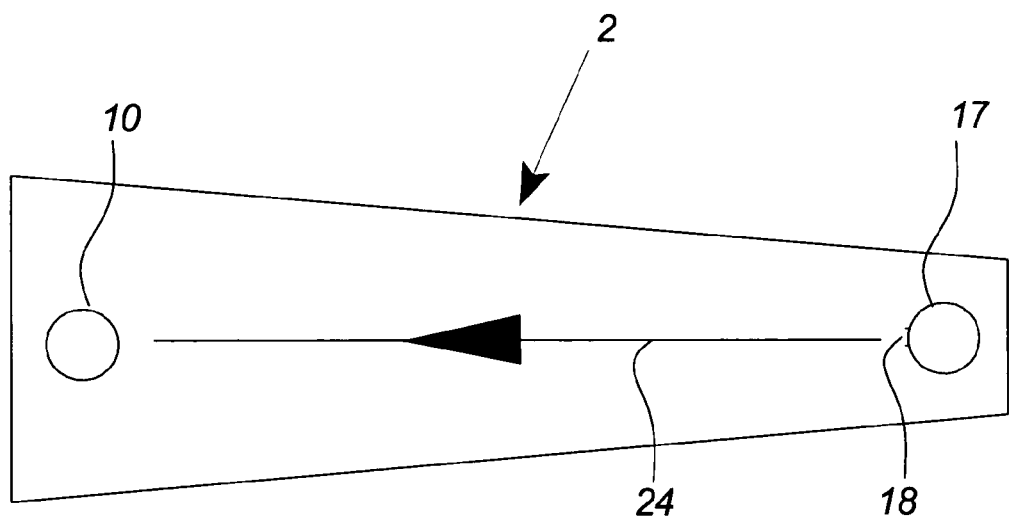

FIGS. 6a and 6b show schematic illustrations of the flow conditions in a first embodiment of a mould box, seen from the side and from above, respectively. In FIG. 6a, it is shown how the mould box 2 is provided with a first example of a control unit 17 for controlling the flow of the cooling or heating medium 24 inside the box. The control unit 17 is placed inside the box, immediately above the inlet stub 8 where the "fresh" cooling or heating medium 19 enters the box. In order to control or lead the cooling or heating medium, the unit is provided with a number of openings 18 in that side of the unit which faces down towards the outlet stub 10. In a preferred embodiment, five openings are disposed uniformly up along the side of the unit. However, a greater or smaller number of openings can also be provided. With the openings 18, an even and uniform flow of cooling or heating medium 24 is created down along the inner sides of the box 2 until the outlet stub 10 is reached, where the "used" cooling or heating medium 20 runs out.

In FIG. 6b, the flow of cooling or heating medium 24 in the box 2 is seen from the top. Here, it is seen that the openings 18 in the unit 17 are disposed centrally in the unit so that the flow extends evenly down through the box to the outlet stub 10. In a variation of the embodiment, several openings can be disposed at the side of one another so that two smaller flows are created along the inner sides of the box 2.

Figure 7A:
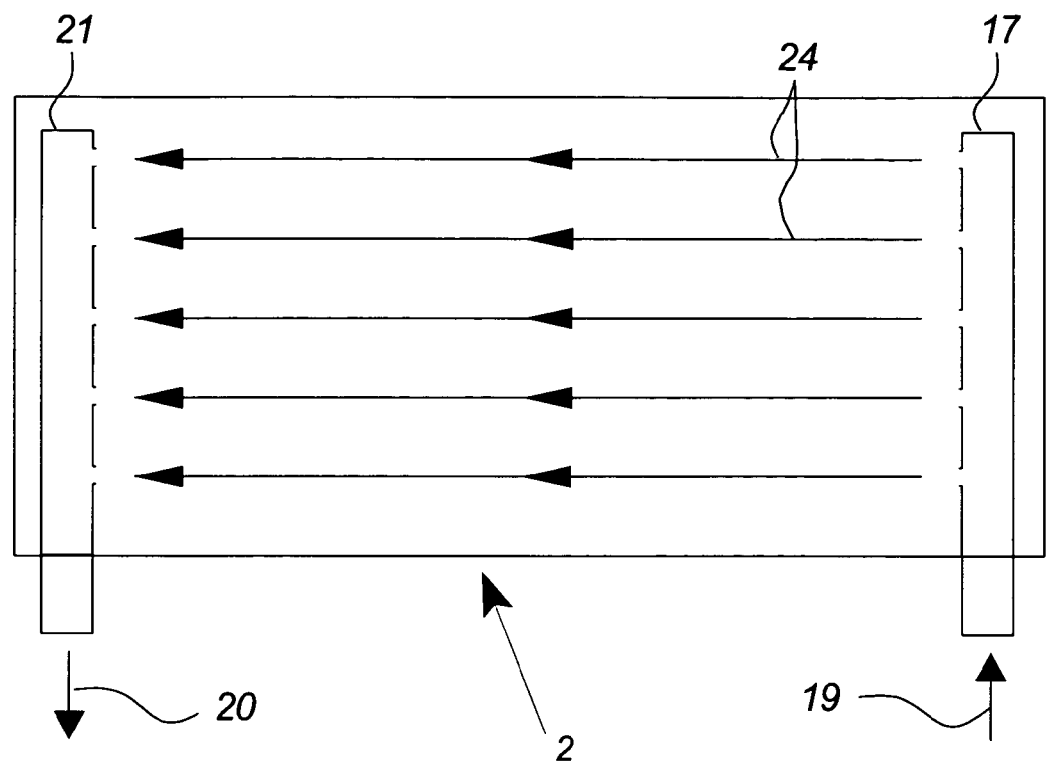
FIGS. 7a and 7b show schematic illustrations of the flow conditions in a second and third embodiments of mould boxes, respectively, as seen from the side.
Figure 7B:
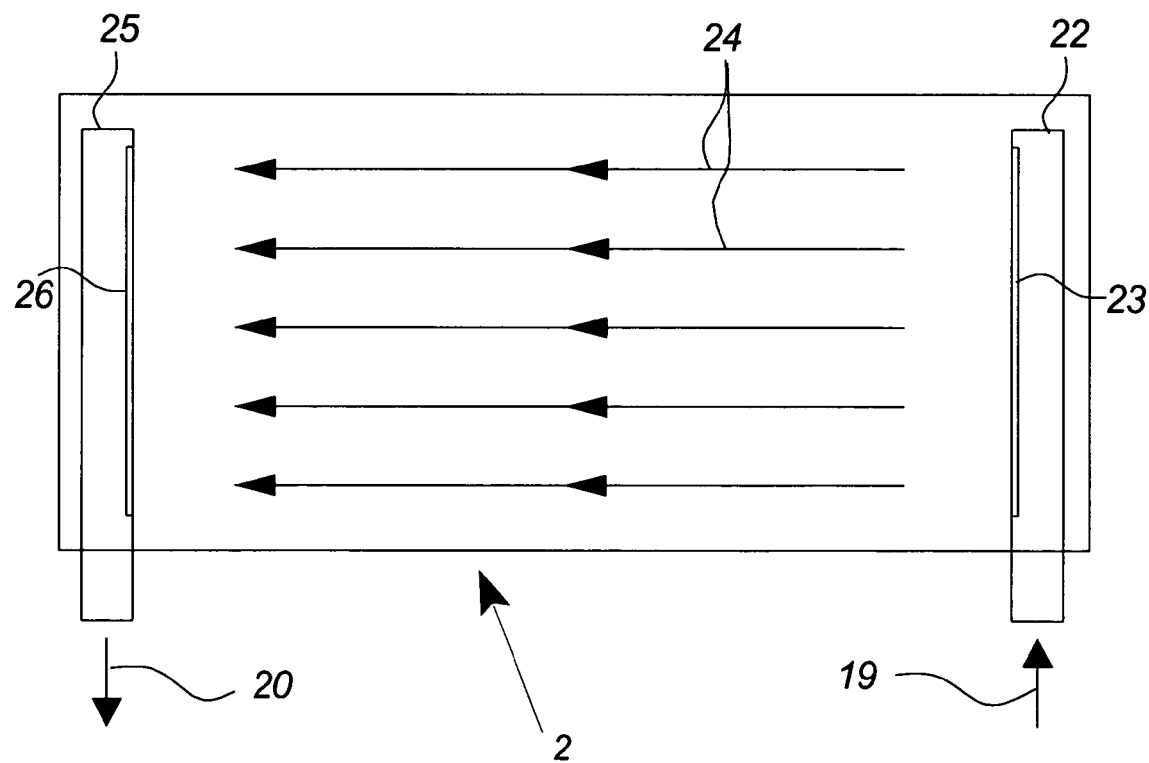

FIGS. 7a and 7b show schematic illustrations of the flow conditions in a second and third embodiments of mould boxes, respectively, as seen from the side. In FIG. 7a, there is shown a second embodiment where the control unit 17 for controlling the flow of the cooling or heating medium 24 inside the box is placed opposite a discharge unit 21, which ensures that the flow of cooling or heating medium is led down to the outlet stub 10 without the formation of secondary flows. In the embodiment shown, the discharge unit 21 is shown with a number of openings corresponding to the number of openings in the control unit 17.

In FIG. 7b shows a third embodiment where the control unit 22 and the discharge unit are each provided with an elongated opening 23 and 26, respectively.

Figure 8A:
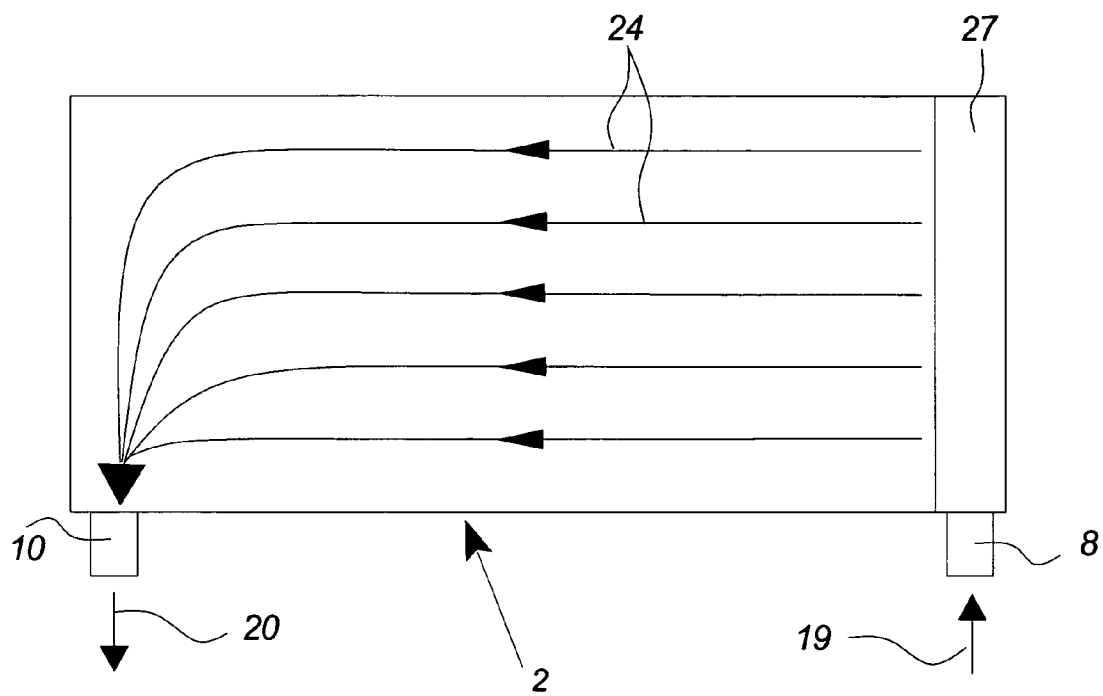
FIGS. 8a and 8b show schematic illustrations of the flow conditions in a fourth embodiment of a mould box, seen from the side and from above, respectively.
Figure 8B:
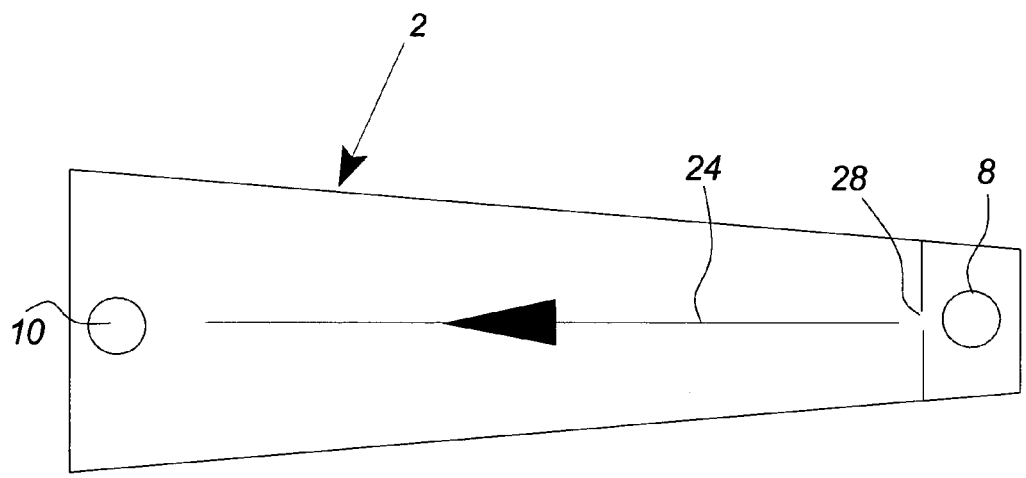

FIGS. 8a and 8b show schematic illustrations of the flow conditions in a fourth embodiment of a mould box, seen from the side and from above, respectively. In the mould box 2, the control unit 27 is built as an integral part of the surfaces in the box, where the two side surfaces in the box are connected with a further surface which is provided with an opening or openings 28 as most clearly shown in FIG. 8b. The surfaces surround the inlet stub 8 and ensure that the cooling or heating medium 24 is controlled through the box 2 as shown in the figures.

Figures 9A, 9B, 9C:
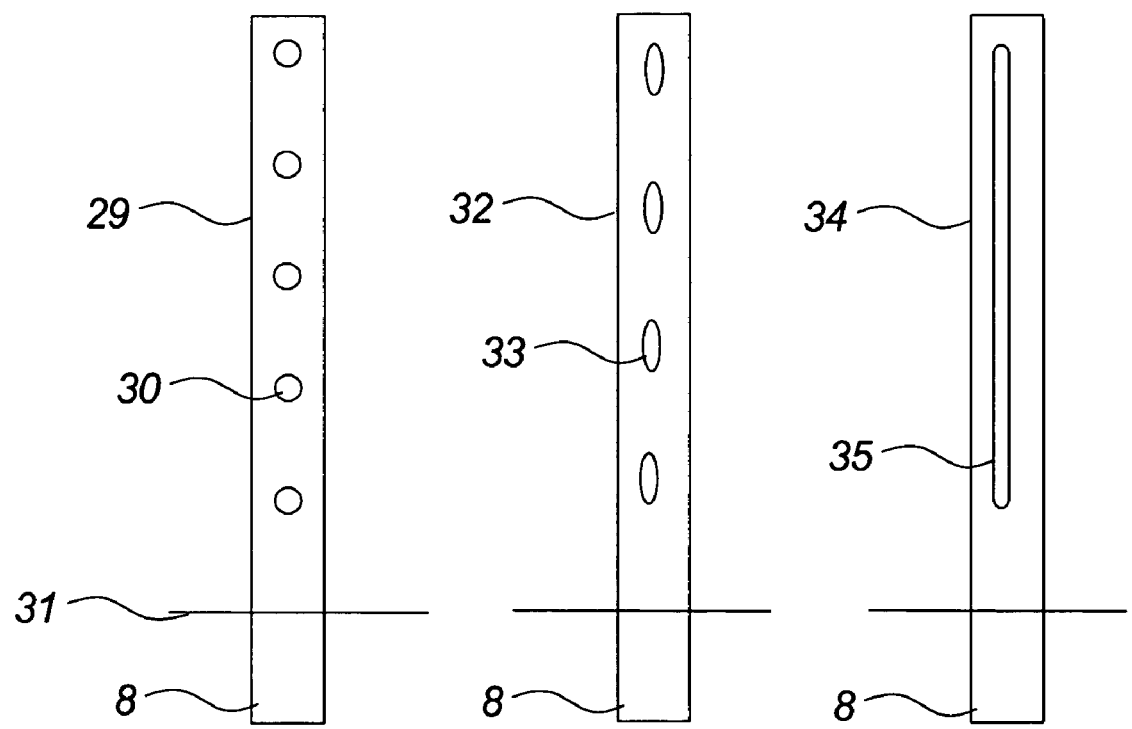
FIGS. 9a to 9c show front views of different embodiments of a control unit in accordance with the invention.

FIGS. 9a to 9c show different embodiments of a control unit 29, 32, 34, respectively, according to the invention. Each control unit is provided with a different type of openings. The control units are shown placed above the inlet stub 8, but separated by the bottom surface 31 of the mould box. In FIGS. 9a and 9b, it is shown that the control unit 29, 32 have openings which are placed over one another and at equal intervals from one another. In the first embodiment shown in FIG. 9a, the openings are round 30, while in the second embodiment shown in FIG. 9b, the openings are oval 33. Further, the openings may be of a rectangular or a similar at least four sided shape in other embodiments. Even further, the openings may be of a more irregular shape. In variations of these, there can be openings which, for example, are not placed immediately over one another, but alternately at equal distances on each their side of a vertical centreline, or all on the same side of the centreline. The number of openings can also vary, and the size of the openings and shape of the opening can similarly be varied.

Another example of an embodiment of the control unit where the shape of the opening is varied can be seen in FIG. 9c. Here, the opening is a long slot 35 which extends from bottom to top in the control unit 34. In this example, the slot is shown displaced in relation to a vertical centreline for the control unit, but can also be placed on the centreline.

In general, the control units can be configured in various types of metal or plastic which can tolerate the load from the cooling or heating medium and the temperature of same. The control units may also be made in combinations of metal and plastic, e.g. the unit being made in metal except for sections of plastic around the openings. The plastic material may be replaceable sections of the unit, for example, in order to be able to change opening shape. It should also be evident that the shape of the control units can similarly be varied in many different ways.

Figure 10:
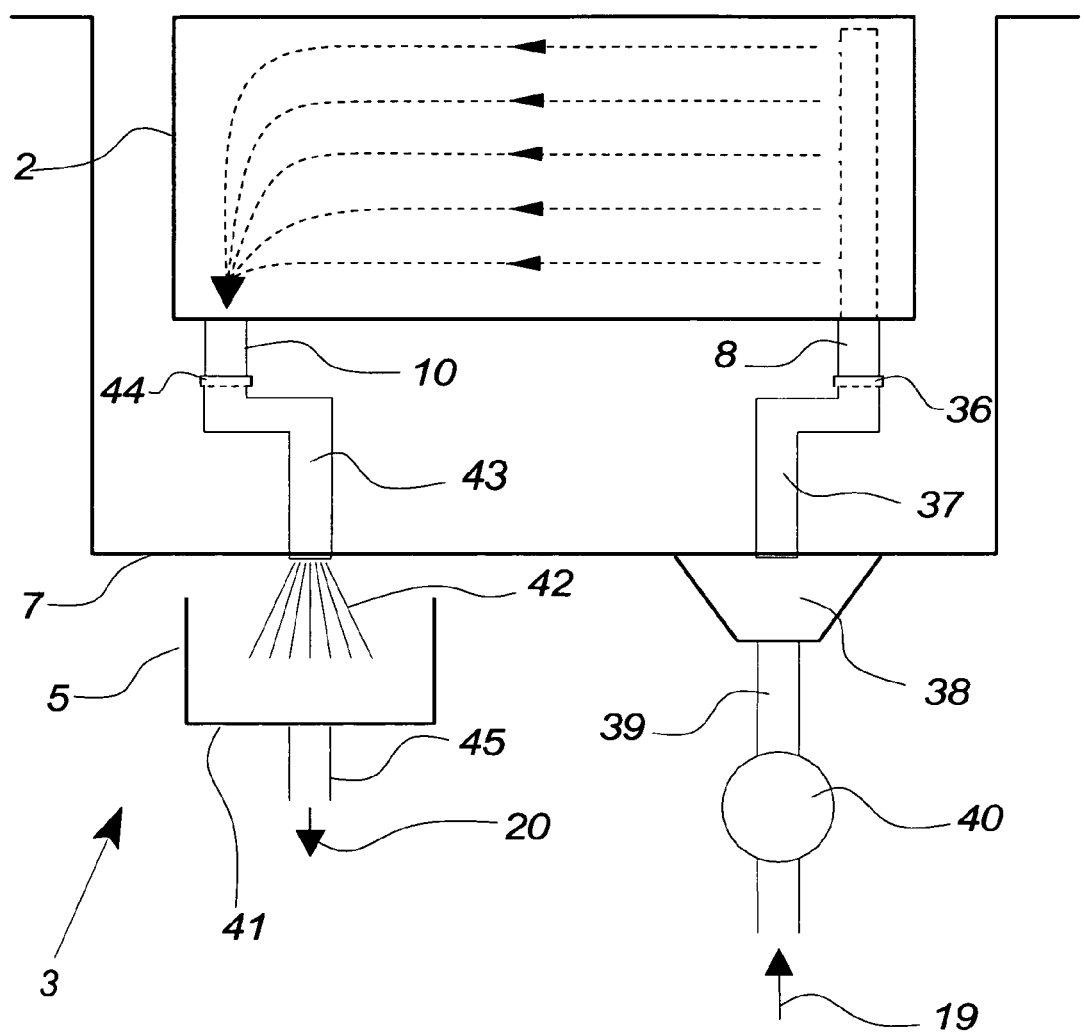
FIG. 10 shows a schematic cross-sectional view of a system for use in creating form-moulded items of edible ice from an ice mass.

FIG. 10 shows a schematic cross-sectional view of a system 3 for use in creating form-moulded items of edible ice from an ice mass. The section shows that part of the system 3 which involves the supply of cooling medium to a mould box, and for allowing the cooling medium to flow out of the mould box. The system 3 includes a fixed part 5 in which a number of mould boxes 2 can be lowered and connected to a plant for cooling medium. The plant includes a pump 40 which pumps cooling medium 19 through a pipe 39 to an inlet channel 38. The inlet channel is secured to the underside 7 of that surface which defines the outer surrounds of the area in which the boxes 2 are lowered.

In the inlet channel 38, there is formed an overpressure which ensures that the cooling medium is pressed further up in the pipe 37 which ends in a snap-coupling 36. The snap-coupling 36 enables the lowering and connection of a mould box 2 to the supply of cooling medium 19 through the box's inlet stub 8 for a cooling or heating medium. Likewise, a snap-coupling 44 enables connection of the mould box's outlet stub 10, whereby the "used" cooling medium 19 can be flowed out of the box 2. The used cooling medium 19 runs through a pipe 43 to an outlet 42 where it runs freely out into a discharge channel 41, which in turn, is connected to a discharge pipe 45. From the discharge pipe, the used cooling or heating medium 20 is led back for a renewed cooling or heating, after which, it can again be introduced into the system 3.

In a preferred embodiment, the shown pipes 37 and 43 are made wholly or partly of a flexible material such as rubber or plastic. Alternatively, the pipes can be suspended in a flexible manner, for example, by means of rubber or plastic muffs, in order to achieve a movement in the mould box which is sufficient to allow its positioning to be adapted to the given conditions.

Figure 11:
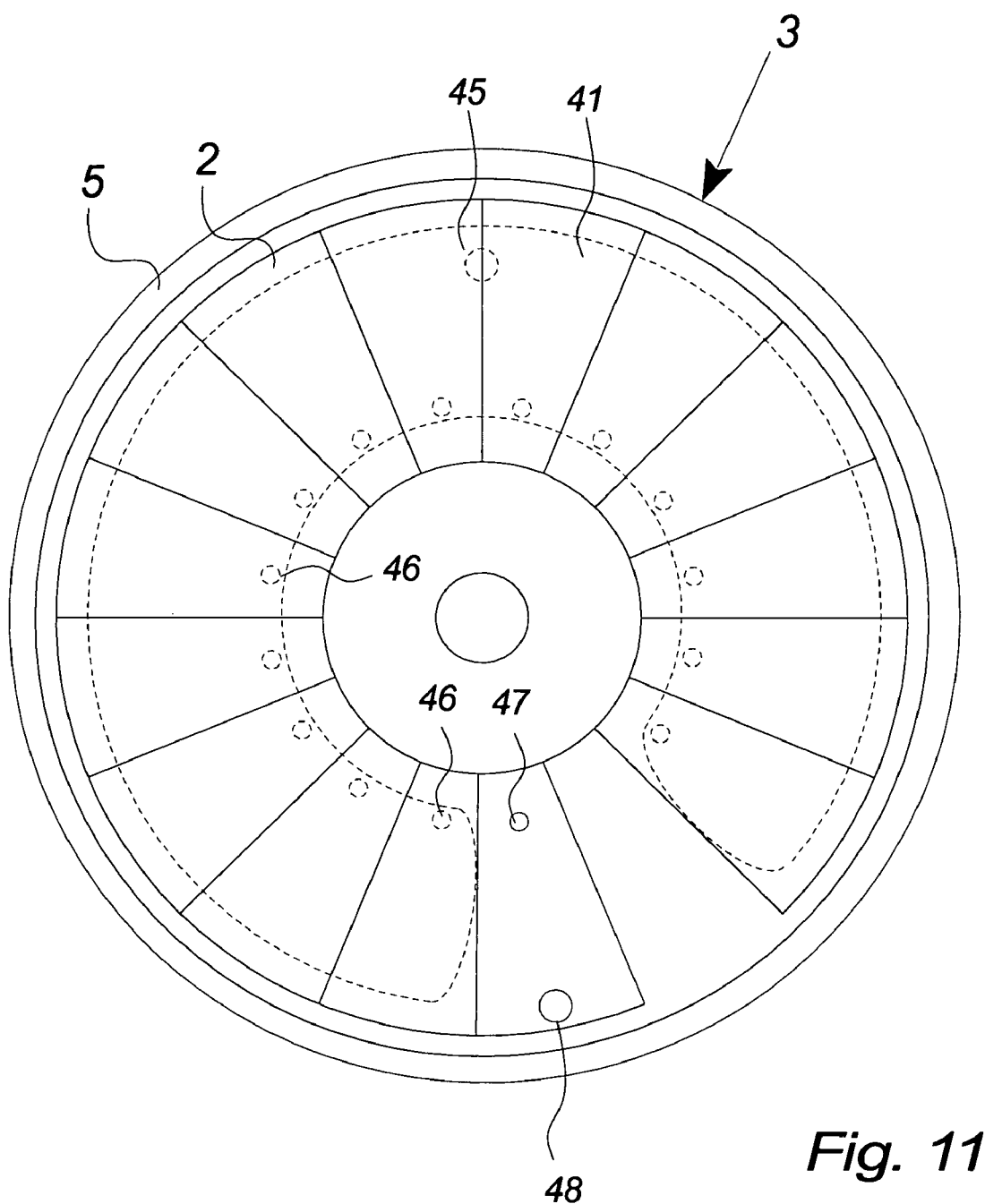
FIG. 11 shows a top schematic view of the system for use in creating form-moulded items of edible ice from an ice mass.

FIG. 11 shows a preferred embodiment of the system 3, seen from above, for use in creating form-moulded items of edible ice from an ice mass. The system 3 includes, among other things, a number of mould boxes 2 placed in a circular recess in the fixed part 5 of the system 3. The mould boxes 2 can be disposed over inlets for a cooling medium 46 with associated discharge channel 41 with outlet for cooling medium 45, or over an inlet 47 for a heating medium with associated outlet 48.

The system 3 functions in the manner of a carousel, where the individual mould boxes 2 are moved in a circular tour from a first position. In the first position, the moulds are filled with the ice mass, and the cooling medium is forced in through the box for the first time. Hereafter, the box 2 are moved in the carousel, where the box receives new cooling medium at each new position until it reaches a heating medium position. At the heating medium position, the heating medium will be forced through the box, whereby the outermost surface of the ice mass (now frozen) is melted. With the melting, the ice item which has been moulded, detaches from the surfaces of the mould, and can then be removed from the mould. The process then starts again from the beginning.

The invention has been exemplified above with reference to specific examples. However, it should be understood that the invention is not limited to the particular examples described above, but may be used in connection with a wide variety of applications. Further, it should be understood that the shape of the control units and the openings according to the invention may be implemented in various manner in other embodiments, and fall within the scope of the invention described.

What is claimed is:

1. Method for creating form-moulded items of edible ice from an ice mass, said method comprising:
    defining a plurality of mould cavities between a number of mould halves, each of the mould halves being formed of a hollow box containing one or more control units;
    filling the plurality of mould cavities defined between the number of mould halves with an ice mass,
    introducing cooling or heating medium into each of said mould halves, and
    controlling the flow of the cooling or heating medium in a manner creating an even and uniform flow along inner sides of the hollow box from an inlet connection stub at one end of the mold halve through the respective mould halve across the side of the plurality of mould cavities facing into the hollow box, to the respective outlet connection stub at an opposite end of the mold halve, with the one or more control units in said mould halves.

2. Method according to claim 1, wherein cooled brine is used as the cooling medium.

3. Method according to claim 1, wherein at least one opening of said one or more control units controls the flow of the cooling or heating medium in a direction substantially at right-angles to the direction of flow for the cooling or heating medium at the inlet stubs.

4. System for creating form-moulded items of edible ice from an ice mass, where said system comprises:
    a plurality of mould halves which define a plurality of mould cavities between them for the receiving of an ice mass, each of the plurality of mould halves being a hollow box having an inlet connection stub and an outlet connection stub at opposite end of the mold halve from the inlet connection stub,
    a fixed part having at least one supply that provides cooling and heating medium with associated delivery system for the cooling and heating medium and at least one collection that collects cooling and heating medium, and an area for the placing of the plurality of mould halves, and
    at least two connection couplings between said at least one supply and said connection stubs of said mould halves,
    wherein said mould halves have one or more control units therein for controlling flow of the cooling or heating medium in a manner creating an even and uniform flow along inner sides of the hollow box from the inlet connection stub, through the respective mould halve across the side of the plurality of mould cavities facing into the hollow space, to a respective outlet connection stub.

5. System according to claim 4, wherein said at least two connection couplings are snap-couplings at least one of the connections for each of the connection couplings including a flexible pipe.

6. System according to claim 4, wherein said fixed part includes an inlet channel through which cooling medium is supplied jointly to said mould boxes, and an outlet channel where the cooling medium is collected and led away after having flowed through the mould halves.

7. System according to claim 4, wherein cooled brine is used as cooling medium.

8. System according to claim 4, wherein each of said mould halves comprises:
- a plurality of surfaces with at least one surface forming at least a portion of one mould cavity and the plurality of surfaces defining at least one inner cavity,
- one or more sets of inlet and outlet stubs in connection with the at least one inner cavity, so that a cooling or heating medium can flow through said least one cavity from the inlet stub to the outlet stub, and
- one or more control units for controlling flow of the cooling or heating medium positioned in said at least one inner cavity.

9. System according to claim 8, wherein said one or more control units are in direct connection with said inlet stub.

10. System according to claim 8, further including one or more discharge units.

11. System according to claim 10, wherein at least one of said one or more control units and said one or more discharge units have at least one opening.

12. System according to claim 11, wherein said least one opening is circular or oval in shape.

13. System according to claim 11, wherein said least one opening is rectangular in shape.

14. System according to claim 11, wherein said least one opening is an elongated opening.

15. System according to claim 8, wherein said one or more control units include openings of a variety of shapes.

16. System according to claim 11, wherein said least one opening controls the flow of the cooling or heating medium in a direction substantially at right-angles to the direction of flow for the cooling and heating medium at the inlet stubs.

17. System according to claim 8, wherein said one or more control units are made of at least one of metal and plastic.

18. System according to claim 17, wherein said one or more control units include sections of replaceable openings.

19. System according to claim 8, further including at least one discharge unit in direct connection with said outlet stub.

* * * * *